(12) United States Patent
Wagoner et al.

(10) Patent No.: US 10,756,658 B2
(45) Date of Patent: Aug. 25, 2020

(54) ALLOCATING REACTIVE POWER PRODUCTION FOR DOUBLY FED INDUCTION GENERATOR WIND TURBINE SYSTEM

(71) Applicant: General Electric Company, Schenectady, NY (US)

(72) Inventors: Robert Gregory Wagoner, Roanoke, VA (US); Talha Haque, Roanoke, VA (US); Edward Wayne Hardwicke, Jr., Greenville, SC (US); David Scott Wilmer, Roanoke, VA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/642,442

(22) Filed: Jul. 6, 2017

(65) Prior Publication Data

US 2019/0013754 A1 Jan. 10, 2019

(51) Int. Cl.
  *H02P 9/00* (2006.01)
  *H02J 3/38* (2006.01)
  *H02P 101/15* (2016.01)
(52) U.S. Cl.
  CPC .............. *H02P 9/007* (2013.01); *H02J 3/386* (2013.01); *H02P 2101/15* (2015.01)
(58) Field of Classification Search
  CPC ..................................................... H02P 9/007
  See application file for complete search history.

(56) References Cited

U.S. PATENT DOCUMENTS

| 5,083,039 | A  | * | 1/1992  | Richardson ........... F03D 7/0272 |
|           |    |   |         | 290/44                              |
| 7,834,472 | B2 |   | 11/2010 | Rebsdorf et al.                     |
| 7,884,492 | B2 |   | 2/2011  | Xiong et al.                        |
| 9,587,626 | B2 |   | 3/2017  | Sadaba et al.                       |
| 9,716,384 | B2 | * | 7/2017  | Alonso Sadaba ..... F03D 7/0272    |
| 9,831,810 | B2 | * | 11/2017 | Achilles ................ H02J 3/1842 |

(Continued)

FOREIGN PATENT DOCUMENTS

EP         2709266 A2     3/2014

OTHER PUBLICATIONS

International Search Report, dated Mar. 15, 2019 for International Application No. PCT/US2018/040577.

*Primary Examiner* — Sean Gugger
(74) *Attorney, Agent, or Firm* — Dority & Manning, P.A.

(57) ABSTRACT

Systems and methods for allocating reactive power production in a doubly-fed induction generator (DFIG) wind turbine system including a DFIG and a power converter including a line side converter and a rotor side converter are provided. A method can include obtaining a reactive power production requirement, obtaining one or more operating parameters for the DFIG and the line side converter, and determining a priority ratio based at least in part on the one or more operating parameters. The priority ratio can be a ratio of reactive power production between the DFIG and the line side converter. The method can further include controlling the DFIG and the line side converter based at least in part on the reactive power production requirement and the priority ratio such that the combined reactive power production from the DFIG and the line side converter meet the reactive power production requirement.

19 Claims, 5 Drawing Sheets

(56) References Cited

U.S. PATENT DOCUMENTS

| | | | | |
|---|---|---|---|---|
| 2005/0040655 | A1* | 2/2005 | Wilkins | F03D 7/02 290/44 |
| 2010/0117605 | A1* | 5/2010 | Kretschmann | H02P 9/007 322/28 |
| 2010/0256829 | A1* | 10/2010 | Alonso Sadaba | F03D 7/0272 700/287 |
| 2010/0308585 | A1* | 12/2010 | Jorgensen | F03D 7/0284 290/44 |
| 2011/0156389 | A1* | 6/2011 | Arlaban Gabeiras | H02J 3/1885 290/44 |
| 2011/0295437 | A1* | 12/2011 | Lu | H02P 9/105 700/287 |
| 2012/0115662 | A1* | 5/2012 | Han | H02P 9/04 475/31 |
| 2012/0139243 | A1* | 6/2012 | Koerber | F03D 7/0284 290/44 |
| 2012/0306204 | A1* | 12/2012 | Garcia | H02J 3/1857 290/44 |
| 2013/0334824 | A1* | 12/2013 | Freda | F03D 80/70 290/55 |
| 2015/0369217 | A1* | 12/2015 | Gupta | H02J 3/16 290/44 |

* cited by examiner

US 10,756,658 B2

ALLOCATING REACTIVE POWER PRODUCTION FOR DOUBLY FED INDUCTION GENERATOR WIND TURBINE SYSTEM

FIELD

The present disclosure relates generally to wind turbine power systems, and more particular to systems and methods for allocating reactive power production for a doubly-fed induction generator wind turbine system.

BACKGROUND

Wind turbine power systems, such as doubly-fed induction generator (DFIG) wind turbine systems, often include a power converter. For example, DFIG wind turbine systems can include a power converter with an AC-DC-AC topology, wherein a rotor side converter converts AC power from the rotor to DC power at a DC bus, and a line side converter converts the DC power from the DC bus to AC power suitable for an electrical grid. Thus, power generated by the DFIG can be provided to an electrical grid via two paths. For example, the stator of a DFIG can be synchronously connected to the electrical grid, while power generated by the rotor of the DFIG can be provided to the grid via the power converter.

The DFIG can be configured to provide both real power (measured in Watts) and reactive power (measured in VARs). For example, by controlling the switching cycle of the rotor side converter, the real and reactive power generated by the stator can be controlled. Similarly, by controlling a switching cycle of the line side converter, the real and reactive power generated by the rotor can be controlled. Thus, the combined amount of reactive power generated by the DFIG wind turbine system can be controlled to meet a reactive power production requirement, such as a reactive power production requirement set by a dispatch control system of a utility company.

In a typical configuration, the stator of a DFIG can be configured to supply the reactive power for the system unless the stator runs out of current margin, in which case, the line side converter can be used to help make reactive power to meet the reactive power production requirement. However, in such a configuration, the stator may be subjected to increased stresses as compared to the line side converter. For example, the stator may be subjected to increased currents, temperatures, losses, or other stresses that can reduce the efficiency and operating life of the DFIG. These increased stresses can cause the DFIG to wear out at a faster rate, increasing replacement costs and decreasing system availability and reliability.

BRIEF DESCRIPTION

Aspects and advantages of the invention will be set forth in part in the following description, or may be obvious from the description, or may be learned through practice of the invention.

One example aspect of the present disclosure is directed to a control method for allocating reactive power production in a Doubly-Fed Induction Generator (DFIG) wind turbine system. The DFIG wind turbine system can include a DFIG and a power converter. The power converter can include a line side converter and a rotor side converter. The control method can include obtaining, by a control device comprising one or more processors and one or more memory devices, a reactive power production requirement for the DFIG wind turbine system. The control method can further include obtaining, by the control device, one or more operating parameters for the DFIG and the line side converter. The one or more operating parameters can be one or more of a DFIG current, a DFIG voltage, a line side converter current, a line side converter voltage, a real power measurement, a reactive power measurement, a current phase angle, and a DFIG rotational speed. The control method can further include determining one or more stress factors for the DFIG and the line side converter based at least in part on the one or more operating parameters. Each stress factor can be indicative of a stress on the line side converter or the DFIG. The control method can further include determining, by the control device, a priority ratio based at least in part on the one or more stress factors for the DFIG and the line side converter. The priority ratio can be a ratio of reactive power production between the DFIG and the line side converter. The control method can further include controlling, by the control device, the DFIG and the line side converter based at least in part on the reactive power production requirement and the priority ratio. As a result of controlling the DFIG and the line side converter, the combined reactive power production from the DFIG and the line side converter meets the reactive power production requirement.

Another example aspect of the present disclosure is directed to a control system for a Doubly-Fed Induction Generator (DFIG) wind turbine system. The DFIG wind turbine system can include a DFIG and a power converter. The power converter can include a line side converter and a rotor side converter. The control system can include one or more processors and one or more memory devices. The control system can be configured to perform operations. The operations can include obtaining a reactive power production requirement for the DFIG wind turbine system. The operations can further include obtain one or more operating parameters for the DFIG and the line side converter. The one or more operating parameters can be one or more of a DFIG current, a DFIG voltage, a line side converter current, a line side converter voltage, a real power measurement, a reactive power measurement, a current phase angle, or a DFIG rotational speed. The operations can further include determining one or more stress factors for the DFIG and the line side converter based at least in part on the one or more operating parameters. Each stress factor can be indicative of a stress on the line side converter or the DFIG. The operations can further include determining a priority ratio based at least in part on the one or more stress factors for the DFIG and the line side converter. The priority ratio can be a ratio of reactive power production between the DFIG and the line side converter. The operations can further include controlling each of the DFIG and the line side converter based at least in part on the reactive power production requirement and the priority ratio. As a result of controlling the DFIG and the line side converter, the combined reactive power production from the DFIG and the line side converter can meet the reactive power production requirement.

Yet another example aspect of the present disclosure is directed to a doubly fed induction generator (DFIG) wind turbine system. The DFIG wind turbine system can include a DFIG comprising a rotor and a stator, a rotor bus coupled to the rotor, a stator bus coupled to the stator, and a power converter coupled to the rotor bus and a line side bus. The power converter can include a rotor side converter and a line side converter. The DFIG wind turbine system can further include a control system comprising one or more processors and one or more memory devices. The control system can be configured to perform operations. The operations can include obtaining a reactive power production requirement for the DFIG wind turbine system. The operations can further include obtaining a respective current operating parameter for the DFIG and the line side converter. The operations can further include determining a priority ratio based at least in part on the respective current operating parameters for the DFIG and the line side converter. The priority ratio can be a ratio of reactive power production between the DFIG and the line side converter. The operations can further include controlling each of the DFIG and the line side converter based at least in part on the reactive power production requirement and the priority ratio. As a result of controlling the DFIG and the line side converter, the combined reactive power production from the DFIG and the line side converter can meet the reactive power production requirement.

Variations and modifications can be made to these example embodiments of the present disclosure.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
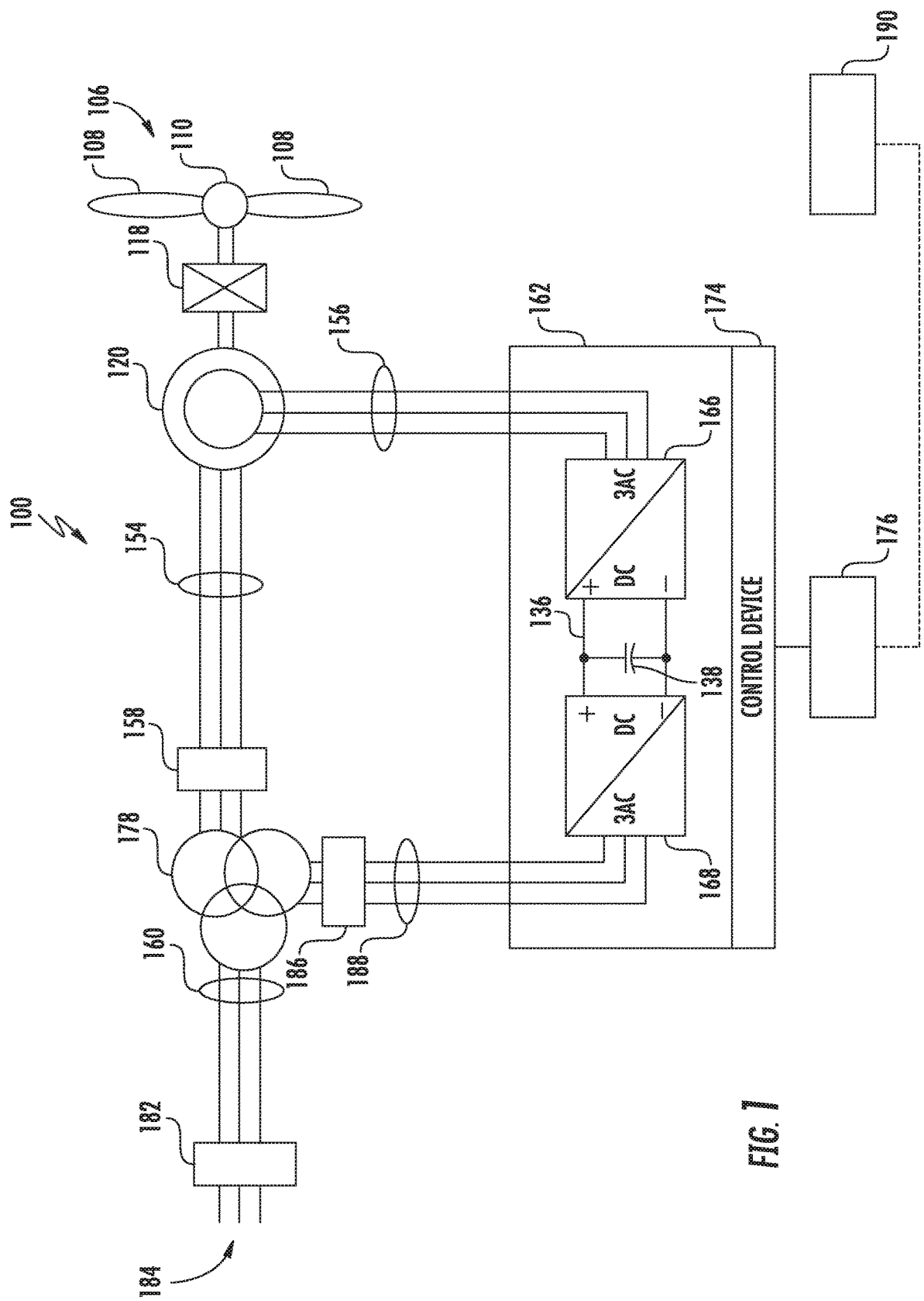
FIG. 1 depicts an example DFIG wind turbine system according to example aspects of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, example aspects of the present disclosure are directed to systems and methods of allocating reactive power production in a DFIG wind turbine system. More particularly, a DFIG wind turbine system can include a DFIG with a rotor and a stator. The stator can be synchronously connected to an electrical grid, and the rotor can be connected to a power converter. The power converter can include a rotor side converter and a line side converter. Power generated by the rotor of the DFIG can be provided to the electrical grid via the power converter. The DFIG and the line side converter can be used to generate reactive power, and as such are the two primary reactive power sources in the DFIG wind turbine system. As used herein, the term "reactive power source" refers to either a DFIG or a line side converter.

A control method can include obtaining, by a control device comprising one or more processors and one or more memory devices, a reactive power production requirement for the DFIG wind turbine system. For example, a reactive power production requirement can be a reactive power production setpoint received from a control system, such as an external dispatch system of utility company. For example, the DFIG wind turbine system can be dispatched to provide reactive power in order to support an electrical grid. The control device can be configured to receive the reactive power production requirement by, for example, receiving a command indicative of a reactive power production requirement from the control system.

The method can further include obtaining, by the control device, one or more operating parameters for the DFIG wind turbine system. For example, the control device can be operatively connected to one or more sensors, such as one or more voltage, current, power, temperature, or DFIG rotational speed sensors, and can be configured to receive measurements indicative of one or more operating parameters of the DFIG wind turbine system. For example, in some implementations, the control device may be configured to obtain a respective current operating parameter for the DFIG and the line side converter. In some implementations, the control device can be configured to obtain one or more of a DFIG temperature, a DFIG voltage, a line side converter temperature, a line side converter voltage, a real power measurement, a reactive power measurement, a current phase angle, or a DFIG rotational speed. In some implementations, the control device can be configured to determine one or more operating parameters based on one or more operating parameters obtained from one or more sensors. For example, in some implementations, the control device can be configured to determine a real power or a reactive power output for a reactive power source based on one or more current, voltage, and phase angle measurements.

The method can further include determining, by the control device, a priority ratio based at least in part on the one or more operating parameters for the reactive power sources (i.e., the DFIG and the line side converter). The priority ratio can be a ratio of reactive power production between the DFIG and the line side converter. As used herein, the term "priority ratio" refers to a ratio of reactive power production between a DFIG and a line side converter. The priority ratio can be expressed in any number of ways, such as a percentage, a per unit value, a reactive power production split (e.g., X reactive power for DFIG to Y reactive power for line side converter), or other ratio indicating an allocation of reactive power production between the DFIG and the line side converter.

In some implementations, a stress factor, such as a current factor, a capability factor, a loss factor, a life factor, or other stress factor can be determined by the control device based at least in part on a current operating parameter for the DFIG and the line side converter. As used herein, the term "stress factor" refers to a factor indicative of an operational stress on the line side converter or DFIG. Stress factors can include, for example, current factors, loss factors, reactive power capability factors, temperature factors, life factors, or other stress factors.

For example, in some implementations, a current operating parameter can be used to determine a current factor, and the current factor can then be used to determine the priority ratio. A current operating parameter can be, for example, a current value measured in a single phase, a RMS value in a multi-phase system (e.g., three-phase), an instantaneous current, an average current over a period of time, or other current operating parameter. As used herein, the term "current factor" can refer to a current measurement, or a current capacity between a current measurement and one or more thresholds (e.g., current limits). The current factor can be determined based at least in part on the current operating parameter such as, for example, by comparing the current operating parameter to a current limit (e.g., a current threshold). For example, a control device can determine a current factor for a reactive power source by, for example, determining how close the reactive power source is operating to a current limit.

In some implementations, the priority ratio can be determined based at least in part on the current factor. For example, in some implementations, the current factor can be used to prioritize reactive power production from the reactive power source that is operating furthest from a respective current limit. In some implementations, the current factor can be weighted, and used with other factors in determining a priority ratio, as described herein.

In some implementations, one or more operating parameters can be used to determine a priority ratio by determining one or more other stress factors. For example, a current operating parameter, a voltage operating parameter, a temperature operating parameter, or other operating parameters can be used to determine a reactive power capability factor. As used herein, the term "reactive power capability factor" refers to either a maximum capacity of a reactive power source to produce reactive power or an incremental reactive power production capacity above a current reactive power production level. For example, a current operating parameter can be used along with a voltage operating parameter to determine the amount of real and/or or reactive power the reactive power source is producing at a particular point in time. Using a look-up table or an on-the-fly calculation, the reactive power capability factor for the reactive power source can be determined by the control device based on the amount of real and/or reactive power being produced by the reactive power source. In some implementations, the reactive power capability factor can further be determined based on other operating parameters, such as an operating temperature of the reactive power source, one or more voltage or current limits for the reactive power source, or other operating parameters.

In some implementations, the priority ratio can be determined based at least in part on the reactive power capability factor. For example, in some implementations, the reactive power capability factor can be used to prioritize reactive power production from a reactive power source that is operating furthest from its respective reactive power capability. In some implementations, a reactive power source may already be operating at its respective reactive power capability, and thus all additional reactive power production can be prioritized to the other reactive power source. In some implementations, reactive power capability factor can be weighted, and used with other factors in determining a priority ratio, as described herein.

In some implementations, one or more operating parameters can be used to determine a priority ratio by determining a loss factor. As used herein, the term "loss factor" refers to the losses that occur or would occur in a reactive power source at one or more reactive power production levels. For example, a loss factor for a line side converter can be determined to account for all losses in the converter, such as losses in switching devices in the converter, at one or more reactive power production levels. Similarly, a loss factor for a DFIG can account for all losses in the DFIG, such as resistive and excitation losses, at one or more reactive power production levels. The loss factor can be determined based on measured operating parameters, such as current, voltage, or other operating parameters. In some implementations, the loss factor can be determined from a lookup table, or an on-the-fly calculation.

In some implementations, the priority ratio can be determined based at least in part on the loss factor. For example, in some implementations, the loss factor can be used to prioritize reactive power production from a reactive power source that produces the least losses. In some implementations, the reactive power production can be allocated to evenly distribute losses among the reactive power sources. In some implementations, the reactive power production can be allocated to produce the least losses for the DFIG wind turbine system. In some implementations, the loss factor can be weighted, and used with other factors in determining a priority ratio, as described herein.

In some implementations, one or more operating parameters can be used to determine a priority ratio by determining a temperature factor. As used herein, the term "temperature factor" refers to temperature stresses on a reactive power source. For example, a temperature factor for a line side converter can be determined to account for the stresses on a line side converter, such as when an operating temperature can cause the degradation of insulative materials or an increase in resistive losses attributable to an operating temperature increase. Similarly, a temperature factor for a DFIG can account for temperature stresses in the DFIG, such as derating that may occur due to excessive temperatures in a generator winding. In some implementations, the temperature factor can refer to a temperature measurement, or a temperature capacity between a temperature measurement and one or more thresholds (e.g., temperature limits) The temperature factor can be determined based on measured operating parameters, such as current, voltage, or other operating parameters. In some implementations, the temperature factor can be determined from a lookup table, or an on-the-fly calculation.

In some implementations, the priority ratio can be determined based at least in part on the temperature factor. For example, in some implementations, the temperature factor can be used to prioritize reactive power production from a reactive power source that is operating the furthest from a temperature limit. In some implementations, the reactive power production can be allocated to evenly distribute temperature stresses among the reactive power sources. In some implementations, the reactive power production can be allocated to produce the least temperature stresses for the DFIG wind turbine system. In some implementations, the temperature factor can be weighted, and used with other factors in determining a priority ratio, as described herein.

In some implementations, one or more operating parameters can be used to determine a priority ratio by determining a life factor. As used herein, the term "life factor" refers to an expected operational life for a reactive power source. For example, a life factor for a line side converter can be determined to account for the impacts of stresses on the operational life of the line side converter, such as the effects of approaching or exceeding temperature, voltage, current, or other operational constraints on the line side converter. Similarly, a life factor for a DFIG can account for the impacts of stresses on the operational life of a DFIG, such as damage that can be caused by operating near or over various current, temperature, or voltage constraints. The life factor can be determined based on measured operating parameters, such as current, voltage, or other operating parameters and, in some cases, an operational history for the reactive power source. In some implementations, the life factor can be determined from a lookup table, or an on-the-fly calculation.

In some implementations, the priority ratio can be determined based at least in part on the life factor. For example, in some implementations, the reactive power production can be prioritized to extend the operational life of a reactive power source. In some implementations, reactive power production can be prioritized to a reactive power source with the life factor indicating the longest expected operational life. For example, reactive power production can be prioritized to a reactive power source that is expected to have the longest operational life based on a comparison between the life factors of the two reactive power sources. In some implementations, reactive power production can be allocated to a reactive power source in order to prioritize reactive power production based on a replacement cost. For example, in some implementations, reactive power production can be allocated to a reactive power source with a cheaper replacement cost. In some implementations, the life factor can be weighted, and used with other factors in determining a priority ratio, as described herein.

In some implementations, a weighting factor can be determined for each stress factor in a plurality of stress factors used to determine a priority ratio. A weighting factor can be, for example, a factor that weights a stress factor relative to one or more other stress factors. For example, the weighting factor can be expressed in a per unit, percent, ratio, or other weighting value. In some implementations, the weighting factors can be determined from a lookup table, an on-the-fly calculation, or a user input. In some implementations, the weighting factor can be determined from a lookup table based at least in part on one or more operating parameters.

In some implementations, the priority ratio can be determined based at least in part on weighting factors for the respective stress factors. For example, a user may decide to prioritize reactive power allocation in order to minimize losses, while still accounting for temperature stresses. In such a case, the user can assign a first weighting factor (e.g. 60%) to a loss factor and a second weighting factor (e.g., 40%) to a temperature factor. The priority ratio can then be determined based on weighting the loss factor by the first weighting factor and the temperature factor by the second weighting factor.

The method can further include controlling, by the control device, the DFIG and the line side converter based at least in part on the reactive power production requirement and the priority ratio. For example, the DFIG and the line side converter can be controlled such that the combined reactive power production from the DFIG and the line side converter meet the reactive power production requirement. As used herein, the combined reactive power production from the DFIG and the line side converter "meet" the reactive power production requirement when the combined reactive power produced by the DFIG and line side converter are at least the reactive power production requirement. In other words, the combined reactive power production requirement can be equal to the reactive power production requirement, or the combined reactive power production can exceed the reactive power production requirement. In some implementations, controlling the DFIG and the line side converter based at least in part on the reactive power production requirement and the priority ratio can include controlling a switching cycle of the line side converter and the rotor side converter. For example, the line side converter can be controlled to generate reactive power from the line side converter, while the rotor side converter can be controlled to generate reactive power in the DFIG.

In this way, the systems and methods according to example aspects of the present disclosure can have a technical effect of allowing for reactive power production to be allocated between a line side converter in a DFIG in a DFIG wind turbine system based at least in part on one or more operating parameters, such as current, voltage, or other operating parameters. Moreover, the systems and methods according to example aspects of the present disclosure can allow for meeting reactive power production requirements for a DFIG wind turbine system while accounting for various stress factors, such as temperature, current, loss, reactive power capability, and life factors. This can help to extend the operational life of one or more components in the DFIG wind turbine system, thereby increasing system reliability and availability.

With reference now to the FIGS., example embodiments of the present disclosure will now be discussed in detail. FIG. 1 depicts an example wind driven doubly-fed induction generator (DFIG) wind turbine system 100. Example aspects of the present disclosure are discussed with reference to the DFIG wind turbine system 100 of FIG. 1 for purposes of illustration and discussion. Those of ordinary skill in the art, using the disclosures provided herein, should understand that example aspects of the present disclosure are also applicable in other power systems, such as synchronous, asynchronous, permanent magnet, and full-power conversion wind turbines, solar, gas turbine, or other suitable power generation systems.

In the example system 100, a rotational component 106 includes a plurality of rotor blades 108 coupled to a rotating hub 110. The rotational component 106 is coupled to an optional gear box 118, which is, in turn, coupled to a generator 120. In accordance with aspects of the present disclosure, the generator 120 is a doubly fed induction generator (DFIG) 120.

DFIG 120 can include a rotor and a stator. DFIG 120 is typically coupled to a stator bus 154 and a power converter 162 via a rotor bus 156. The stator bus 154 provides an output multiphase power (e.g. three-phase power) from a stator of DFIG 120 and the rotor bus 156 provides an output multiphase power (e.g. three-phase power) of a rotor of the DFIG 120. Referring to the power converter 162, DFIG 120 is coupled via the rotor bus 156 to a rotor side converter 166. The rotor side converter 166 is coupled to a line side converter 168 which in turn is coupled to a line side bus 188.

In example configurations, the rotor side converter 166 and the line side converter 168 are configured for normal operating mode in a three-phase, pulse width modulation (PWM) arrangement using insulated gate bipolar transistor (IGBT) or similar switching elements. The rotor side converter 166 and the line side converter 168 can be coupled via a DC link 136 across which is the DC link capacitor 138. In an embodiment, a transformer 178, such as a three-winding transformer, can be coupled to the line bus 188, the stator bus 154, and a system bus 160. The transformer 178 can convert the voltage of power from the line bus 188 and the stator bus 154 to a voltage suitable for providing to an electrical grid 184 via system bus 160.

The power conversion system 162 can be coupled to a control device 174 to control the operation of the rotor side converter 166 and the line side converter 168. It should be noted that the control device 174, in typical embodiments, is configured as an interface between the power conversion system 162 and a control system 176. In one implementation, the control device 174 can include a processing device (e.g. microprocessor, microcontroller, etc.) executing computer-readable instructions stored in a computer-readable medium. The instructions when executed by the processing device can cause the processing device to perform operations, including providing control commands (e.g. pulse width modulation commands) to the switching elements of the power converter 162 and other aspects of the wind turbine system 100.

In operation, alternating current power generated at DFIG 120 by rotation of the rotational component 106 is provided via a dual path to electrical grid 184. The dual paths are defined by the stator bus 154 and the rotor bus 156. On the rotor bus side 156, sinusoidal multi-phase (e.g. three-phase) alternating current (AC) power is provided to the power converter 162. The rotor side power converter 166 converts the AC power provided from the rotor bus 156 into direct current (DC) power and provides the DC power to the DC link 136. Switching elements (e.g. IGBTs) used in bridge circuits of the rotor side power converter 166 can be modulated to convert the AC power provided from the rotor bus 156 into DC power suitable for the DC link 136.

The line side converter 168 converts the DC power on the DC link 136 into AC output power suitable for the electrical grid 184, such as AC power synchronous to the electrical grid 184, which can be transformed by transformer 178 before being provided to the electrical grid 184. In particular, switching elements (e.g. IGBTs) used in bridge circuits of the line side power converter 168 can be modulated to convert the DC power on the DC link 136 into AC power on the line side bus 188. The AC power from the power converter 162 can be combined with the power from the stator of DFIG 120 to provide multi-phase power (e.g. three-phase power) having a frequency maintained substantially at the frequency of the electrical grid 184 (e.g. 50 Hz/60 Hz).

The power converter 162 can receive control signals from, for instance, the control system 174. The control signals can be based, among other things, on sensed conditions or operating characteristics of the wind turbine system 100. Typically, the control signals provide for control of the operation of the power converter 162. For example, feedback in the form of sensed speed of the DFIG 120 can be used to control the conversion of the output power from the rotor bus 156 to maintain a proper and balanced multi-phase (e.g. three-phase) power supply. Other feedback from other sensors can also be used by the controller 174 to control the power converter 162, including, for example, stator and rotor bus voltages and current feedbacks. Using the various forms of feedback information, switching control signals (e.g. gate timing commands for IGBTs), stator synchronizing control signals, and circuit breaker signals can be generated.

In some implementations, power converter 162 can be controlled to produce reactive power in order to meet a reactive power production requirement. For example, an external control system 190 can be configured to provide a reactive power production requirement signal to control system 176 and/or control device 174. External control system 190 can be, for example, a user interface wherein a user can input reactive power production requirement or a control system configured to dispatch one or more sources of power generation, such as a utility company's dispatch system. The reactive power production requirement can be, for example, a reactive power production setpoint for the DFIG wind turbine system 100.

The control system 176 and/or control device 174 can together control the power converter 162 to produce reactive power according to the reactive power production requirement. For example, control system 176 and/or control device 174 can control a switching cycle of line side converter 168 in order to produce reactive power. For example, control system 176 and/or control device 174 can control a switching behavior of line side converter 168 such that a current from the line side converter 168 comes into or out of phase with a sinusoidal voltage of the electrical grid 184 in order to produce or absorb reactive power. Similarly, control system 176 and/or control device 174 can control a switching cycle of rotor side converter 166 in order to produce or absorb reactive power from the DFIG 120.

Various circuit breakers and switches, such as a line bus breaker 186, stator bus breaker 158, and grid breaker 182 can be included in the system 100 to connect or disconnect corresponding buses, for example, when current flow is excessive and can damage components of the wind turbine system 100 or for other operational considerations. Additional protection components can also be included in the wind turbine system 100.

Figure 2:
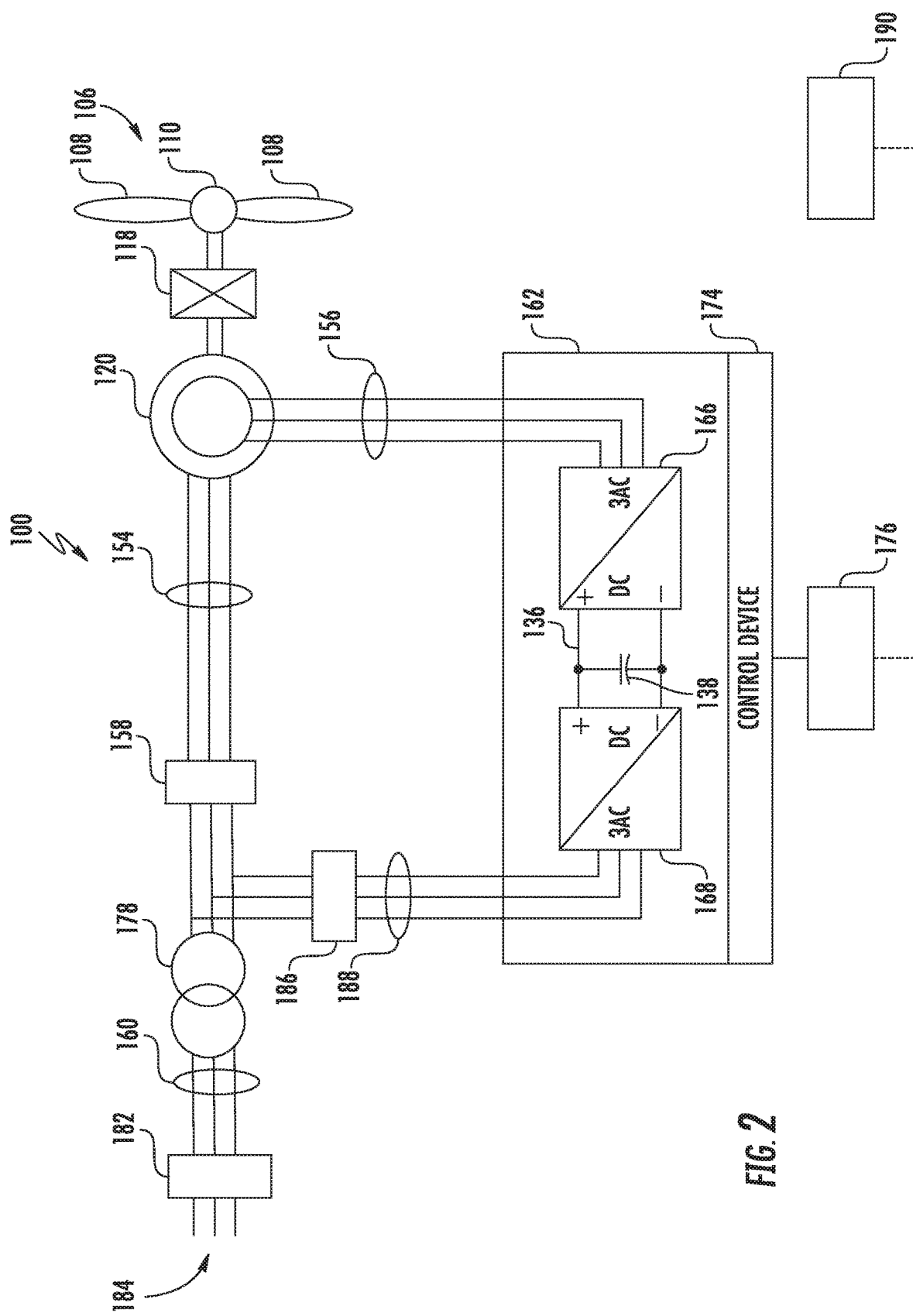
FIG. 2 depicts an example DFIG wind turbine system according to example aspects of the present disclosure.

FIG. 2 depicts an alternate implementation of a DFIG wind turbine system 100 according to additional example aspects of the present disclosure. Elements that are the same or similar to those as in FIG. 1 are referred to with the same reference numerals. As shown, in some implementations, a stator of a DFIG 120 can be coupled to a stator bus 154, which can be coupled to line bus 188. Power from power converter 162 can be combined with power from stator bus 154, and provided to transformer 178 coupled to a to system bus 160. In some implementations, transformer 178 can be a two-winding step-up transformer or an isolation transformer. System bus 160 can be coupled to electrical grid 184. In some implementations, a plurality of DFIG wind turbine systems 100 can be coupled together in a cluster, and power from the cluster of DFIG wind turbine systems 100 can be provided to a cluster transformer (not shown) before power is provided to electrical grid 184.

Figure 3:
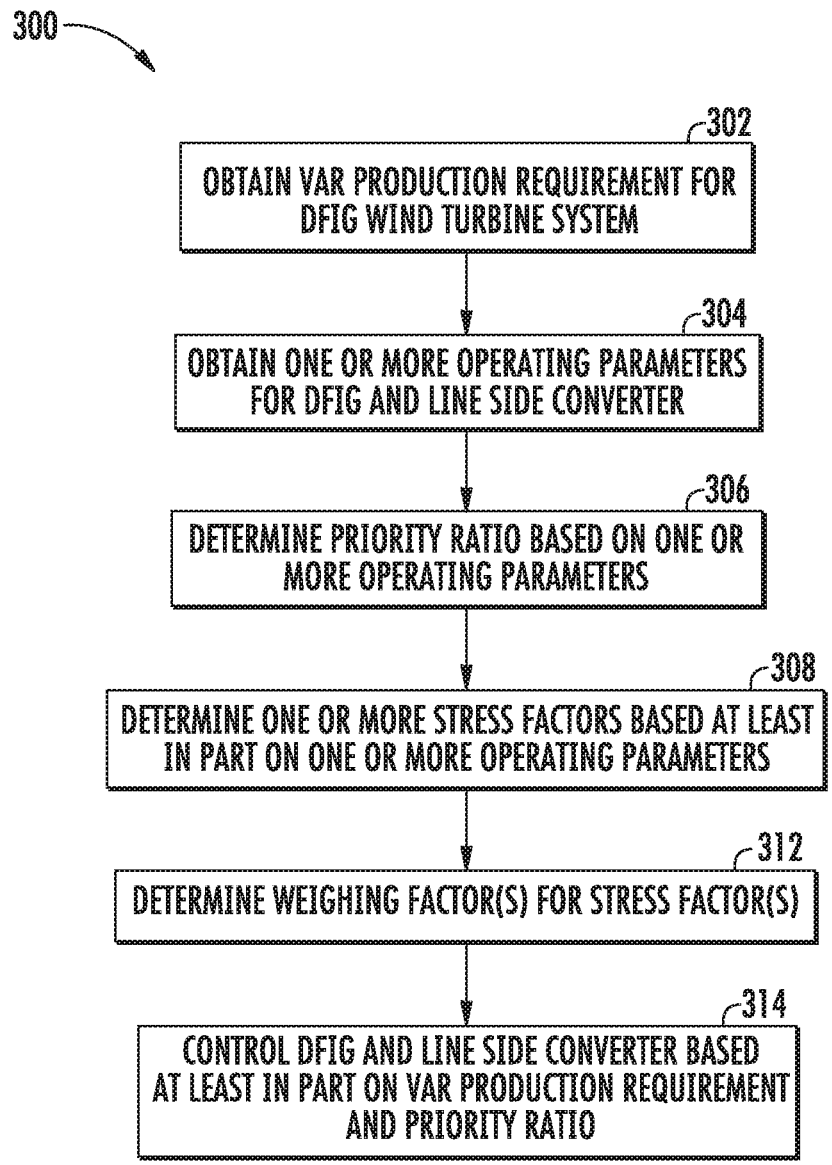
FIG. 3 depicts an example method according to example aspects of the present disclosure.

FIG. 3 depicts a flow diagram of an example method (300) for allocating reactive power production in a DFIG wind turbine system. The method (300) can be implemented by a control device and/or control system, such as a control device 174 or control system 176 depicted in FIG. 1 or the control device/system 510 depicted in FIG. 5. In addition, FIG. 3 depicts steps performed in a particular order for purposes of illustration and discussion. Those of ordinary skill in the art, using the disclosures provided herein, will understand that various steps of any of the methods disclosed herein can be adapted, omitted, rearranged, or expanded in various ways without deviating from the scope of the present disclosure.

At (302), a method (300) can include obtaining a reactive power production requirement for a DFIG wind turbine system. For example, a reactive power production requirement can be a reactive power production setpoint received from a control system, such as an external control system 190 (e.g., utility dispatch control system). For example, the DFIG wind turbine system 100 can be dispatched to provide reactive power in order to support an electrical grid 184. The control device 174 can be configured to receive the reactive power production requirement by, for example, receiving a command indicative of a reactive power production requirement from the control system 190.

At (304), the method (300) can include obtaining one or more operating parameters for the DFIG and the line side converter. For example, the control device 174 can be operatively connected to one or more sensors, such as one or more voltage, current, power, temperature, or DFIG rotational speed sensors, and can be configured to receive measurements indicative of one or more operating parameters of the DFIG wind turbine system 100. For example, in some implementations, the control device 174 may be configured to obtain a respective current operating parameter for the DFIG 120 and the line side converter 168. In some implementations, the control device 174 can be configured to obtain one or more of a DFIG temperature, a DFIG voltage, a line side converter temperature, a line side converter voltage, a real power measurement, a reactive power measurement, a current phase angle, or a DFIG rotational speed. In some implementations, the control device 174 can be configured to determine one or more operating parameters based on one or more operating parameters obtained from one or more sensors. For example, in some implementations, the control device 174 can be configured to determine a real power or a reactive power output for a reactive power source based on one or more current, voltage, and phase angle measurements.

At (306), the method (300) can include determining a priority ratio based on the one or more operating parameters. For example, in some implementations, the priority ratio can be based at least in part on a respective current operating parameter for the DFIG 120 and the line side converter 168. For example, the control device 174 can receive a current operating parameter from a first sensor configured to obtain a current operating parameter measurement for the DFIG 120, such as a current in a winding of the DFIG 120. Similarly, a second sensor can be configured to obtain a current operating parameter measurement for the line side converter 168, such as by measuring a current in a bridge circuit of the line side converter 168 or an output of the line side converter 168 to the line side bus 188. In some implementations, the respective current operating parameters for the DFIG 120 and the line side converter 168 can be used to determine a priority ratio, such as by comparing the current operating parameters to one or more thresholds, and allocating reactive power production based on whether the respective current operating parameters meet or exceed the one or more thresholds. In some implementations, the respective current operating parameters can be used to determine one or more other operating parameters. For example, a current operating parameter can be used with other operating parameters (e.g., a voltage parameter, a phase angle, a DFIG generator rotational speed) and known relationships to determine one or more other operating parameters, such as a real power parameter, a reactive power parameter, a loss parameter, a temperature parameter, etc. In some implementations, the current operating parameter can be used to determine a second operating parameter, and the priority ratio can be based at least in part on the second operating parameter.

In some implementations, the priority ratio can be based at least in part on one or more stress factors (i.e., a factor indicative of a stress on the line side converter 168 or DFIG 120). For example, at (308), the method (300) can include determining one or more stress factors based at least in part on the one or more operating parameters. For example, in some implementations, a current operating parameter can be used to determine a current factor, and the current factor can then be used to determine the priority ratio. A current operating parameter can be, for example, a current value measured in a single phase, a RMS value in a multi-phase system (e.g., three-phase), an instantaneous current, an average current over a period of time, or other current operating parameter. The current factor can be determined based at least in part on the current operating parameter such as, for example, by comparing the current operating parameter to a current limit. For example, a control device 174 can determine a current factor for a reactive power source by, for example, determining how close the reactive power source is operating to a current limit.

In some implementations, the priority ratio can be determined based at least in part on a current factor. For example, in some implementations, the control device 174 can use a current factor to prioritize reactive power production from the reactive power source that is operating furthest from a current limit (e.g., one or more current thresholds).

In some implementations, the priority ratio can be based at least in part on a reactive power capability factor. For example, a control device 174 can use a current operating parameter, a voltage operating parameter, a temperature operating parameter, or other operating parameters to determine a reactive power capability factor (i.e., a maximum capacity of a reactive power source to produce reactive power). For example, a current operating parameter can be used along with a voltage operating parameter to determine the amount of real and/or or reactive power the reactive power source is producing at a particular point in time. Using a look-up table or an on-the-fly calculation, the reactive power capability factor for the reactive power source can be determined by the control device 174 based on the amount of real and/or reactive power being produced by the reactive power source. In some implementations, the reactive power capability factor can further be determined based on other parameters, such as an operating temperature of the component, one or more voltage or current limits for the component, or other operating parameters.

In some implementations, the control device 174 can base the priority ratio at least in part on a reactive power capability factor. For example, in some implementations, the reactive power capability factor can be used to prioritize reactive power production from a reactive power source that is operating furthest from its respective reactive power capability. In some implementations, a reactive power source may already be operating at its respective reactive power capability, and thus all additional reactive power production can be prioritized to the other reactive power source.

In some implementations, a control device 174 can use one or more operating parameters to determine a priority ratio by determining a loss factor. The loss factor can correspond to, for example, the losses that occur in a reactive power source. For example, a loss factor for a line side converter 168 can be determined to account for all losses in the line side converter 174, such as losses in switching devices. Similarly, a loss factor for a DFIG 120 can account for all losses in the DFIG 120, such as resistive and excitation losses. The loss factor can be determined based on the one or more operating parameters, such as current, voltage, or other operating parameters. In some implementations, the loss factor can be determined from a lookup table, or an on-the-fly calculation.

In some implementations, the control device 174 can determine a priority ratio based at least in part on a loss factor. For example, in some implementations, the loss factor can be used to prioritize reactive power production from a reactive power source that produces the least losses. In some implementations, the reactive power production can be allocated to evenly distribute losses among the reactive power sources. In some implementations, the reactive power production can be allocated to produce the least losses for the DFIG wind turbine system 100.

In some implementations, the control device 174 can use the one or more operating parameters to determine a priority ratio by determining a temperature factor. The temperature factor can correspond to, for example, a temperature stress on a reactive power source. For example, a temperature factor for a line side converter 168 can be determined to account for the stresses on a line side converter 168, such as when an operating temperature can cause the degradation of insulative materials or an increase in resistive losses attributable to an operating temperature increase. Similarly, a temperature factor for a DFIG 120 can account for temperature stresses in the DFIG 120, such as derating that may occur due to excessive temperatures in the generator winding. The temperature factor can be determined based on measured operating parameters, such as current, voltage, or other operating parameters. In some implementations, the temperature factor can be determined from a lookup table, or an on-the-fly calculation.

In some implementations, the control device 174 can determine the priority ratio based at least in part on a temperature factor. For example, in some implementations, the temperature factor can be used to prioritize reactive power production from a reactive power source that is operating the furthest from a temperature limit (e.g., one or more temperature thresholds). In some implementations, the reactive power production can be allocated to evenly distribute temperature stresses among the reactive power sources. In some implementations, the reactive power production can be allocated to produce the least temperature stresses for the DFIG wind turbine system 100.

In some implementations, a control device 174 can use one or more operating parameters to determine a priority ratio by determining a life factor. The life factor can correspond to, for example, an expected operational life for a reactive power source. For example, a life factor for a line side converter 168 can be determined to account for the impacts of stresses on the operational life of the line side converter 168, such as the effects of approaching or exceeding temperature, voltage, current, or other operational constraints on the line side converter. Similarly, a life factor for a DFIG 120 can account for the impacts of stresses on the operational life of a DFIG 120, such as damage that can be caused by exceeding current, temperature, or voltage constraints. The life factor can be determined based on measured operating parameters, such as current, voltage, or other operating parameters and, in some cases, an operational history for the reactive power source. In some implementations, the life factor can be determined from a lookup table, or an on-the-fly calculation.

In some implementations, the control device 174 can determine the priority ratio based at least in part on a life factor. For example, in some implementations, the reactive power production can be prioritized to extend the operational life of a reactive power source. For example, the control device 174 can be configured to determine a first expected life factor for the DFIG 120 and line side converter 168 under a first set of operating conditions and reactive power allocation. The control device 174 can then be configured to determine a second expected life factor under a second set of operating conditions and reactive power allocation. The control device 174 can then select a priority ratio with a reactive power allocation that extends the expected operational life of either the line side converter 168 or the DFIG 120 according to the determined life factors. In some implementations, reactive power production can be prioritized to a reactive power source with the life factor indicating the longest expected operational life. For example, the control device 174 can determine a life factor for both a DFIG 120 and a line side converter 168, and reactive power production can be prioritized to the reactive power source that is expected to have the longest operational life based on a comparison between the life factors of the two reactive power sources. In some implementations, reactive power production can be allocated to a reactive power source in order to prioritize reactive power production based on a replacement cost. For example, in some implementations, reactive power production can be allocated to a reactive power source with a cheaper replacement cost.

In some implementations, the priority ratio can be based on a plurality of stress factors. For example, a control device 174 can calculate a reactive power capability factor for each reactive power source. The control device 174 can then calculate a loss factor for each reactive power source. The control device 174 can then determine a priority ratio based on the reactive power capability factors and loss factors, by, for example, allocating reactive power production between the reactive power sources to minimize losses or increase the reactive power capability factor for one of the reactive power sources.

In some implementations, the priority ratio can be based at least in part on one or more weighting factors (i.e., a relative weight for each stress factor as compared to the other stress factors) for the one or more stress factors. For example, at (310), the method can include determining weighting factors for the one or more stress factors. The weighting factor can be expressed in a per unit, percent, ratio, or other relative weighting value. In some implementations, the weighting factors can be determined from a lookup table, an on-the-fly calculation, or a user input. In some implementations, a weighting factor can be determined from a lookup table based at least in part on one or more operating parameters.

In some implementations, the priority ratio can be determined based at least in part on weighting factors for the respective stress factors. For example, a user may decide to prioritize reactive power allocation in order to minimize losses, while still accounting for temperature stresses. In such a case, the user can assign a first weighting factor (e.g. 60%) to a loss factor and a second weighting factor (e.g., 40%) to a temperature factor. The priority ratio can then be determined based on weighting the loss factor by the first weighting factor and the temperature factor by the second weighting factor.

At (312), the method can include controlling the DFIG and the line side converter based at least in part on the reactive power production requirement and the priority ratio. For example, the control device 174 can control the DFIG 120 and the line side converter 168 such that the combined reactive power production from the DFIG 120 and the line side converter 168 meet the reactive power production requirement. In some implementations, controlling the DFIG 120 and the line side converter 168 based at least in part on the reactive power production requirement and the priority ratio can include controlling a switching cycle of the line side converter 168 and the rotor side converter 166. For example, the line side converter 168 can be controlled to generate reactive power from the line side converter 168, while the rotor side converter 166 can be controlled to generate reactive power in the DFIG 120.

Figure 4:
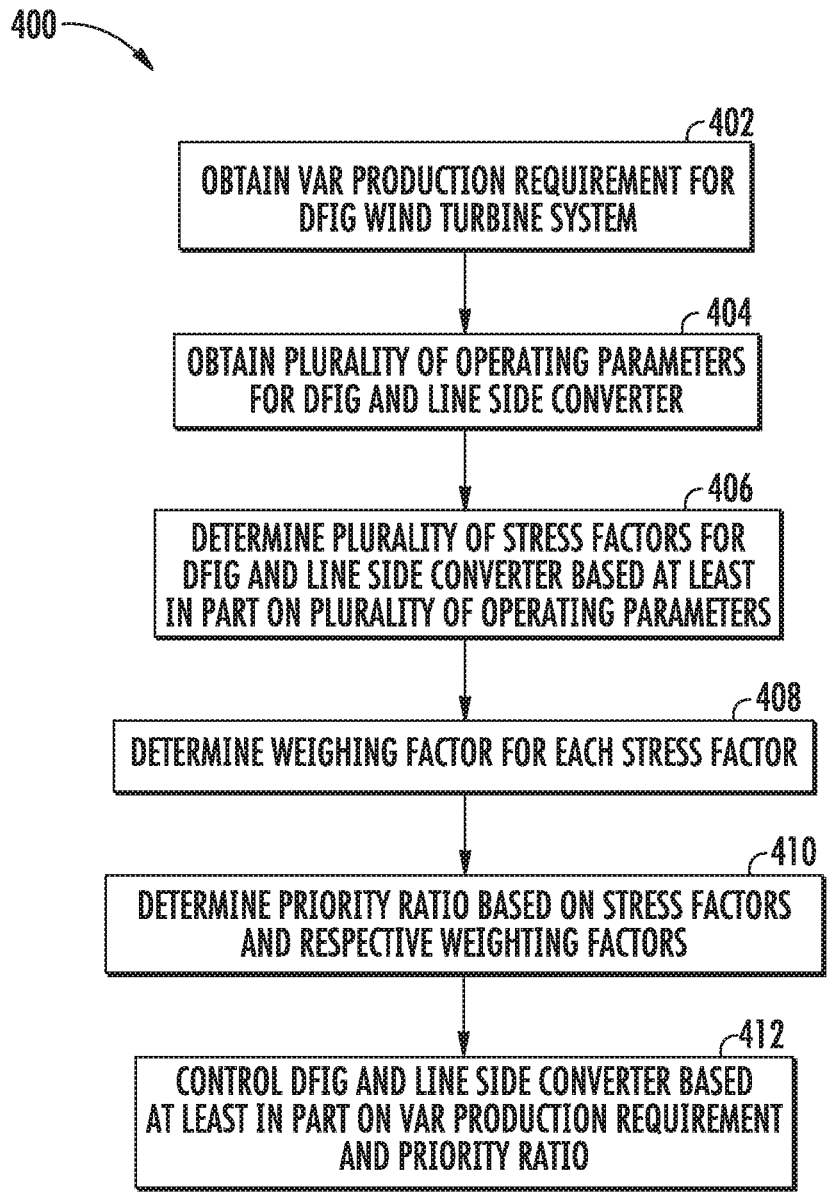
FIG. 4 depicts an example method according to example aspects of the present disclosure.

Referring now to FIG. 4, a flow diagram of an example method (400) for operating a wind turbine system according to an example embodiment of the present disclosure is depicted. The method (400)) can be implemented by a control device and/or control system, such as a control device 174 or control system 176 depicted in FIG. 1 or the control device/system 510 depicted in FIG. 5. In addition, FIG. 4 depicts steps performed in a particular order for purposes of illustration and discussion. Those of ordinary skill in the art, using the disclosures provided herein, will understand that various steps of any of the methods disclosed herein can be adapted, omitted, rearranged, or expanded in various ways without deviating from the scope of the present disclosure.

At (402), the method (400) can include obtaining a reactive power production requirement for a DFIG wind turbine system. For example, a reactive power production requirement can be a reactive power production setpoint received from a control system, such as an external control system 190, as described herein.

At (404), the method (400) can include obtaining one or more operating parameters for the DFIG and the line side converter. For example, the control device 174 and/or control system 176 can be operatively connected to one or more sensors, such as one or more voltage, current, power, temperature, or DFIG rotational speed sensors. The control device 174 can be configured to receive measurements, including a DFIG temperature, a DFIG current, a DFIG voltage, a line side converter temperature, a line side converter current, a line side converter voltage, a real power measurement, a reactive power measurement, a current phase angle, and a DFIG rotational speed, as described herein.

At (406), the method (400) can include determining a plurality of stress factors for the DFIG and line side converter. For example, a control device 174 and/or control system 176 can be configured to determine a plurality of stress factors based at least in part on the plurality of operating parameters, including a DFIG reactive power capability factor, a DFIG loss factor, a DFIG life factor, a DFIG current factor, a DFIG temperature factor, a line side converter reactive power capability factor, a line side converter loss factor, a line side converter life factor, a line side converter current factor, or a line side converter temperature factor, as described herein. In some implementations, a user can determine which stress factors to use in determining a priority ratio.

At (408), the method (400) can include determining a weighting factor for each stress factor in the plurality of stress factors. For example, a control device 174 and/or control system 176 can be configured to determine a weighting factor for each stress factor to be used in determining a priority ratio. The weighting factors can be expressed in a per unit, percent, ratio, or other relative weighting value. In some implementations, the weighting factors can be determined from a lookup table, an on-the-fly calculation, or a user input. In some implementations, the weighting factor can be determined from a lookup table based at least in part on one or more operating parameters.

At (410), the method (400) can include determining a priority ratio based on the stress factors and the respective weighting factors. For example, a control device 174 and/or control system 176 can be configured to determine a priority ratio based at least in part on the weighting factors for each stress factor, as described herein. In some implementations, the weighting factors and/or stress factors can be selected by a user input.

At (412), the method (400) can include controlling the DFIG and the line side converter based at least in part on the reactive power production requirement and the priority ratio. For example, the control device 174 can control the DFIG 120 and the line side converter 168 such that the combined reactive power production from the DFIG 120 and the line side converter 168 meet the reactive power production requirement. In some implementations, controlling the DFIG 120 and the line side converter 168 based at least in part on the reactive power production requirement and the priority ratio can include controlling a switching cycle of the line side converter 168 and the rotor side converter 166. For example, the line side converter 168 can be controlled to generate reactive power from the line side converter 168, while the rotor side converter 166 can be controlled to generate reactive power in the DFIG 120.

Figure 5:
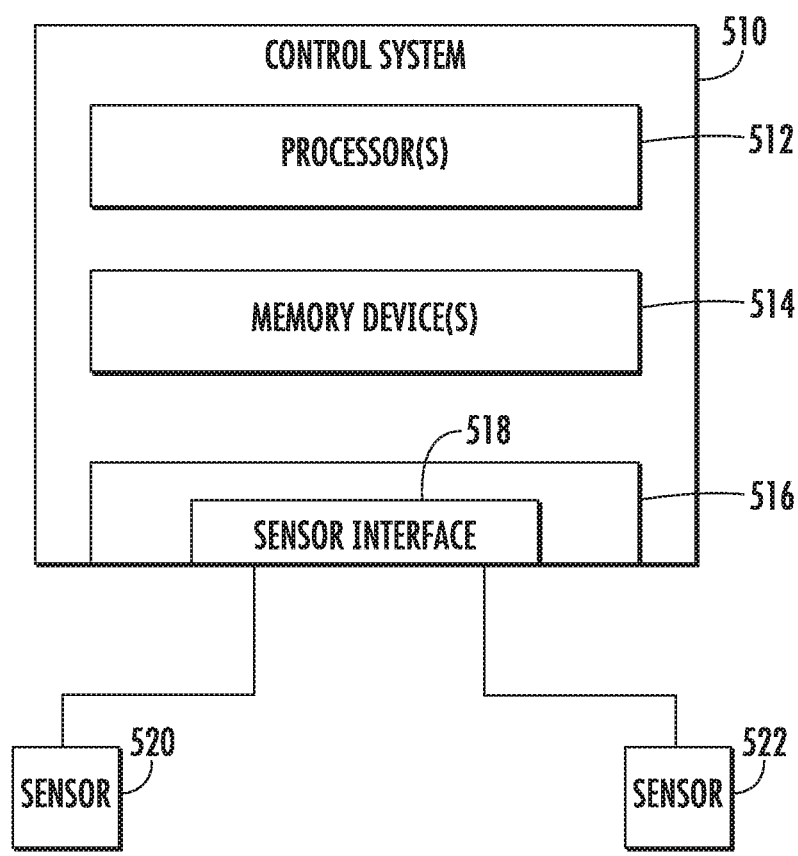
FIG. 5 depicts an example control device according to example aspects of the present disclosure.

FIG. 5 depicts an example control device/system 510 according to example embodiments of the present disclosure. The control device/system 510 can be, for example, a control device 174 or a control system 176, and can be associated with an individual wind turbine system, a wind farm (e.g., a cluster-level or farm-level control device) and/or can include one or more control devices associated with aspects of a wind turbine system, such as one or more control devices configured to control a power converter 162. In some embodiments, the one or more control devices 510 can include one or more processor(s) 512 and one or more memory device(s) 514. The processor(s) 512 and memory device(s) 514 can be distributed so that they are located at one more locales or with different devices.

The processor(s) 512 and memory device(s) 514 can be configured to perform a variety of computer-implemented functions and/or instructions (e.g., performing the methods, steps, calculations and the like and storing relevant data as disclosed herein). The instructions when executed by the processor(s) 512 can cause the processor(s) 512 to perform operations according to example aspects of the present disclosure. For instance, the instructions when executed by the processor(s) 512 can cause the processor(s) 512 to implement the methods of FIGS. 3 (300) and 4 (400) discussed herein.

Additionally, the control device 510 can include a communication interface 516 to facilitate communications between the control device 510 and various components of a wind turbine system, wind farm, or power system, including reactive power production requirements or sensed operating parameters as described herein. Further, the communication interface 518 can include a sensor interface 518 (e.g., one or more analog-to-digital converters) to permit signals transmitted from one or more sensors 520, 522 to be converted into signals that can be understood and processed by the processor(s) 512. It should be appreciated that the sensors (e.g. sensors 520, 522) can be communicatively coupled to the communications interface 518 using any suitable means, such as a wired or wireless connection. The signals can be communicated using any suitable communications protocol. The sensors (520, 522) can be, for example, voltage sensors, current sensors, power sensors, DFIG rotational speed sensors, temperature sensors, or any other sensor device described herein.

As such, the processor(s) 512 can be configured to receive one or more signals from the sensors 520 and 522. For instance, in some embodiments, the processor(s) 512 can receive signals indicative of a voltage or current from the sensor 520. In some embodiments, the processor(s) 512 can receive signals indicative of temperature (e.g. DFIG temperature, line side converter temperature) from sensor 522.

As used herein, the term "processor" refers not only to integrated circuits referred to in the art as being included in a computer, but also refers to a control device, a microcontrol device, a microcomputer, a programmable logic control device (PLC), an application specific integrated circuit, and other programmable circuits. Additionally, the memory device(s) 514 can generally include memory element(s) including, but not limited to, computer readable medium (e.g., random access memory (RAM)), computer readable non-volatile medium (e.g., a flash memory), a compact disc-read only memory (CD-ROM), a magneto-optical disk (MOD), a digital versatile disc (DVD) and/or other suitable memory elements. Such memory device(s) 514 can generally be configured to store suitable computer-readable instructions that, when implemented by the processor(s) 512, configure the control device 510 to perform the various functions as described herein.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A control method for allocating reactive power production in a Doubly-Fed Induction Generator (DFIG) wind turbine system, the DFIG wind turbine system comprising a DFIG and a power converter, the power converter comprising a line side converter and a rotor side converter, the control method comprising:
   obtaining, by a control device comprising one or more processors and one or more memory devices, a reactive power production requirement for the DFIG wind turbine system;
   obtaining, by the control device, one or more operating parameters for the DFIG and the line side converter, wherein the one or more operating parameters comprise one or more of a DFIG current, a DFIG voltage, a line side converter current, a line side converter voltage, a real power measurement, a reactive power measurement, a current phase angle, and a DFIG rotational speed;
   determining, by the control device, one or more stress factors for the DFIG and the line side converter based at least in part on the one or more operating parameters, wherein each stress factor is indicative of an operational stress on the line side converter;
   wherein the one or more stress factors comprise a current factor for each of the line side converter and the DFIG, and the current factor for each of the line side converter and the DFIG is based at least in part on a current capacity for each of the line side converter and the DFIG based on a comparison, by the control device, of the line side converter current to one of more current limits for the line side converter and a comparison, by the control device, of the DFIG current to one or more current limits for the DFIG;
   determining, by the control device, a priority ratio based at least in part on the one or more stress factors for the DFIG and the line side converter, including at least the current factor for each of the line side converter and the DFIG, wherein the priority ratio comprises a ratio of reactive power production between the DFIG and the line side converter; and
   controlling, by the control device, the DFIG and the line side converter based at least in part on the reactive power production requirement and the priority ratio, wherein said controlling includes allocating reactive power production between the DFIG and the line side converter based at least in part on the current capacity for each of the line side converter and the DFIG;
   wherein, as a result of controlling the DFIG and the line side converter, the combined reactive power production from the DFIG and the line side converter meets the reactive power production requirement and produces a reduced operational stress for the line side converter.

2. The control method of claim 1, wherein determining, by the control device, one or more stress factors for the DFIG and the line side converter comprises determining, by the control device, a reactive power capability factor for each of the line side converter and the DFIG; and
   wherein determining, by the control device, the priority ratio comprises determining the priority ratio based at least in part on the reactive power capability factor for each of the line side converter and the DFIG.

3. The control method of claim 1, wherein determining, by the control device, the one or more stress factors for the DFIG and the line side converter comprises determining, by the control device, a loss factor for each of the line side converter and the DFIG; and
   wherein determining, by the control device, the priority ratio comprises determining the priority ratio based at least in part on the loss factor for each of the line side converter and the DFIG.

4. The control method of claim 1, wherein determining, by the control device, the one or more stress factors for the DFIG and the line side converter comprises determining, by the control device, a life factor for each of the line side converter and the DFIG based, at least in part on a replacement cost of the DFIG or line side converter; and
   wherein determining, by the control device, the priority ratio comprises determining the priority ratio based at least in part on the life factor for each of the line side converter and the DFIG.

5. The control method of claim 4, wherein determining the priority ratio based at least in part on the life factor for each of the line side converter and the DFIG comprises determining the priority ratio to extend the operational life of at least one of the DFIG and the power converter.

6. The control method of claim 4, wherein determining the priority ratio based at least in part on the life factor for each of the line side converter and the DFIG comprises prioritizing reactive power production to the DFIG or the power converter with the life factor indicating the longest expected operational life.

7. The control method of claim 1, wherein determining, by the control device, the one or more stress factors for the DFIG and the line side converter comprises determining a plurality of stress factors; the control method further comprising:
   determining, by the control device, a weighting factor for each stress factor in the plurality; and
   wherein determining, by the control device, the priority ratio comprises determining the priority ratio based at least in part on the weighting factor for each stress factor in the plurality.

8. The control method of claim 7, further comprising:
   obtaining, by the control device, a DFIG temperature and a line side converter temperature; and
   wherein determining, by the control device, the one or more stress factors for the DFIG and the line side converter comprises determining, by the control device, a temperature factor for each of the line side converter and the DFIG.

9. The control method of claim 7, wherein determining the weighting factor for each stress factor comprises determining the weighting factor from a lookup table based at least in part on one or more of the plurality of operating parameters for each stress factor.

10. The control method of claim 1, wherein controlling, by the control device, the DFIG and the line side converter based at least in part on the reactive power production requirement and the priority ratio comprises controlling, by the control device, a switching cycle of the line side converter and the rotor side converter.

11. A control system for a Doubly-Fed Induction Generator (DFIG) wind turbine system, the DFIG wind turbine system comprising a DFIG and a power converter, the power converter comprising a line side converter and a rotor side converter, the control system comprising:
   one or more processors and one or more memory devices, the control system configured to perform operations, the operations comprising:
      obtain a reactive power production requirement for the DFIG wind turbine system;
      obtain one or more operating parameters for the DFIG and the line side converter, wherein the one or more operating parameters comprise one or more of a DFIG current, a DFIG voltage, a line side converter current, a line side converter voltage, a real power measurement, a reactive power measurement, a current phase angle, or a DFIG rotational speed;
      determine one or more stress factors for the DFIG and the line side converter based at least in part on the one or more operating parameters, wherein the one or more stress factors are indicative of an operational stress on the line side converter;
      wherein the one or more stress factors comprise a current factor for each of the line side converter and the DFIG and the current factor for each of the line side converter and the DFIG is based on a current capacity for each of the line side converter and the DFIG based, at least in part, on a comparison of the line side converter current to one of more current limits for the line side converter and a comparison of the DFIG current to one or more current limits for the DFIG;
      determine a priority ratio based at least in part on the one or more stress factors for the DFIG and the line side converter, including at least the current factor for each of the line side converter and the DFIG, wherein the priority ratio comprises a ratio of reactive power production between the DFIG and the line side converter; and
      control the DFIG and the line side converter based at least in part on the reactive power production requirement and the priority ratio, wherein said controlling includes allocating reactive power production between the DFIG and the line side converter based at least in part on the current capacity for each of the line side converter and the DFIG;
      wherein, as a result of controlling the DFIG and the line side converter, the combined reactive power production from the DFIG and the line side converter meets the reactive power production requirement and produces a reduced operational stress for the line side converter.

12. The control system of claim 11, wherein the one or more stress factors comprise one or more of: a DFIG reactive power capability factor, a DFIG loss factor, a DFIG life factor, a line side converter reactive power capability factor, a line side converter loss factor, a line side converter life factor, or a line side converter current factor.

13. The control system of claim 11, wherein determining or more stress factors for the DFIG and the line side converter comprises determining a plurality of stress factors;
   wherein the operations further comprise determining a weighting factor for each stress factor in the plurality; and
   wherein the operations further comprise determining the priority ratio based at least in part on the weighting factor for each stress factor in the plurality.

14. The control system of claim 13, wherein the operations further comprise obtaining a DFIG temperature and a line side converter temperature; and
   wherein determining the plurality stress factors for the DFIG and the line side converter comprise determining a temperature factor for each of the line side converter and the DFIG.

15. The control system of claim 13, wherein the weighting factors are determined from a lookup table based at least in part on one or more of the plurality of operating parameters for each stress factor.

16. The control system of claim 11, wherein the DFIG and the line side converter are controlled based at least in part on the reactive power production requirement and the priority ratio by controlling a switching cycle of the line side converter and the rotor side converter.

17. A doubly fed induction generator (DFIG) wind turbine system, comprising:
   a DFIG comprising a rotor and a stator;
   a rotor bus coupled to the rotor;
   a stator bus coupled to the stator;
   a power converter coupled to the rotor bus and a line side bus, the power converter comprising a rotor side converter and a line side converter; and a control system comprising one or more processors and one or more memory devices, the control system configured to perform operations, the operations comprising:
    obtain a reactive power production requirement for the DFIG wind turbine system;
    obtain one or more operating parameters for the DFIG and the line side converter;
    determine one or more stress factors for the DFIG and the line side converter based at least in part on the one or more operating parameters, wherein the one or more stress factors are indicative of an operational stress on the line side converter;
    wherein the one or more stress factors comprise a current factor for each of the line side converter and the DFIG and the current factor for each of the line side converter and the DFIG is based on a current capacity for each of the line side converter and the DFIG based, at least in part, on a comparison of the line side converter current to one of more current limits for the line side converter and a comparison of the DFIG current to one or more current limits for the DFIG
    determine a priority ratio based at least in part on the one or more stress factors for the DFIG and the line side converter, including at least the current factor for each of the line side converter and the DFIG, wherein the priority ratio comprises a ratio of reactive power production between the DFIG and the line side converter; and
    control the DFIG and the line side converter based at least in part on the reactive power production requirement and the priority ratio;
    wherein, as a result of controlling the DFIG and the line side converter, the combined reactive power production from the DFIG and the line side converter meets the reactive power production requirement and produces a reduced operational stress for the line side converter.

18. The DFIG wind turbine system of claim 17, wherein the-one or more operating parameters comprise at least one of a DFIG temperature, a DFIG voltage, a line side converter temperature, a line side converter voltage, a real power measurement, a reactive power measurement, a current phase angle, and a DFIG rotational speed.

19. The DFIG wind turbine system of claim 17, wherein the one or more stress factors comprise at least one of a DFIG reactive power capability factor, a DFIG loss factor, a DFIG life factor, a DFIG temperature factor, a line side converter reactive power capability factor, a line side converter loss factor, a line side converter life factor, a line side converter current factor, and a line side converter temperature factor.

\* \* \* \* \*